US008793580B2

(12) United States Patent
Robinson

(10) Patent No.: US 8,793,580 B2
(45) Date of Patent: Jul. 29, 2014

(54) SYSTEM AND METHOD FOR DISPLAYING AND EDITING DIGITALLY SAMPLED AUDIO DATA

(75) Inventor: Robert S. Robinson, Trenton, NJ (US)

(73) Assignee: Channel D Corporation, Trenton, NJ (US)

( * ) Notice: Subject to any disclaimer, the term of this patent is extended or adjusted under 35 U.S.C. 154(b) by 1592 days.

(21) Appl. No.: 11/759,068

(22) Filed: Jun. 6, 2007

(65) Prior Publication Data

US 2008/0074486 A1 Mar. 27, 2008

Related U.S. Application Data

(60) Provisional application No. 60/811,249, filed on Jun. 6, 2006.

(51) Int. Cl.
*G06F 3/00* (2006.01)
*G11B 3/00* (2006.01)
*G11B 33/10* (2006.01)

(52) U.S. Cl.
CPC . *G11B 33/10* (2013.01); *G11B 3/00* (2013.01)
USPC .......................................................... 715/716

(58) Field of Classification Search
USPC .......................................................... 715/716
See application file for complete search history.

(56) References Cited

U.S. PATENT DOCUMENTS 2,033,479 A * 3/1936 Murphy ............................ 369/6
5,047,999 A * 9/1991 van der Meulen ......... 369/30.17

5,204,969 A 4/1993 Capps et al.
5,227,892 A 7/1993 Lince
5,467,288 A 11/1995 Fasciano et al.
(Continued)

FOREIGN PATENT DOCUMENTS

EP 1258879 11/2002
WO 9103053 3/1991

OTHER PUBLICATIONS

Howarth, Jamie, et al "Correction of Wow and Flutter Effects in Analog Tape Transfers," Audio Engineering Society Convention Paper, 117th Convention, pp. 1-6 (Oct. 2004).

(Continued)

*Primary Examiner* — Boris Pesin
*Assistant Examiner* — Matthew Ell
(74) *Attorney, Agent, or Firm* — Lowenstein Sandler LLP

(57) ABSTRACT

A method and system for receiving audio data, converting the audio data into discretely sampled data, such as digital audio, and transforming the digital samples into a user-controllable visual representation for computer-based data interpretation and editing. A plurality of synchronized streams of sampled data recordings are digitally sampled, segmented, and rendered into a plurality of arc segments. A value of one or more audio data parameters are determined for each arc segment. A visual indication of the parameter value, such as a color, hue, or shade, is determined for each arc segment. The plurality of arc segments are arranged into a plurality of arcs, and the plurality of arcs are arranged as a smooth, continuous radial spiral, or arcs, using graduated grays or colors to denote waveform characteristics to form a realistic visual depiction of a mechanical recording emulating a conventional "vinyl" record. A user may interact with the record image, using a locator cursor, to control and edit the audio data. In addition, recording defects or other features may be highlighted on the surface of the image as color keyed or iconic overlays, to assist in the editing process.

22 Claims, 9 Drawing Sheets

(56) References Cited

U.S. PATENT DOCUMENTS

| | | | |
|---|---|---|---|
| 5,475,835 A | 12/1995 | Hickey | |
| 5,601,436 A | 2/1997 | Sudman et al. | |
| 5,671,377 A * | 9/1997 | Bleidt et al. | 715/723 |
| 5,675,778 A | 10/1997 | Jones | |
| 5,682,326 A | 10/1997 | Klingler et al. | |
| 6,100,881 A | 8/2000 | Gibbons et al. | |
| 6,320,598 B2 | 11/2001 | Davis et al. | |
| 6,335,730 B1 | 1/2002 | Gould | |
| 6,353,510 B2 | 3/2002 | Drouin | |
| 6,359,635 B1 * | 3/2002 | Perttunen | 715/834 |
| 6,370,543 B2 | 4/2002 | Hoffert et al. | |
| 6,441,830 B1 | 8/2002 | Duvall et al. | |
| 6,466,211 B1 | 10/2002 | Havre et al. | |
| 6,507,349 B1 | 1/2003 | Balassanian | |
| 6,532,335 B2 | 3/2003 | Otomo et al. | |
| 6,563,523 B1 | 5/2003 | Suchocki et al. | |
| 6,665,751 B1 | 12/2003 | Chen et al. | |
| 6,845,073 B2 * | 1/2005 | Yamada et al. | 369/53.39 |
| 6,897,868 B2 * | 5/2005 | Cliff | 345/440 |
| 6,958,754 B2 | 10/2005 | Alexander et al. | |
| 7,133,531 B2 | 11/2006 | Karpenstein | |
| 7,640,069 B1 * | 12/2009 | Johnston | 700/94 |
| 2001/0047384 A1 | 11/2001 | Croy | |
| 2003/0009494 A1 * | 1/2003 | Milne et al. | 707/500.1 |
| 2004/0018007 A1 | 1/2004 | Akita | |
| 2004/0120688 A1 | 6/2004 | Poltorak | |
| 2004/0189646 A1 | 9/2004 | Hayashi et al. | |
| 2004/0199277 A1 | 10/2004 | Bianchi et al. | |
| 2004/0258392 A1 * | 12/2004 | Morita et al. | 386/52 |
| 2005/0010409 A1 | 1/2005 | Hull et al. | |
| 2005/0036628 A1 * | 2/2005 | Devito | 381/61 |
| 2005/0212802 A1 | 9/2005 | Takeda et al. | |
| 2006/0065102 A1 | 3/2006 | Xu | |
| 2006/0198610 A1 | 9/2006 | Akifusa | |
| 2006/0202994 A1 | 9/2006 | Chevallier et al. | |
| 2007/0079228 A1 | 4/2007 | Ando et al. | |

OTHER PUBLICATIONS

Parker, Conrad, "Sweep: Audio Editing, Scrubbing and Latency Visualisation," pp. 1-6.
Plangent Process Software, "Frequently Asked Questions," pp. 1-4.
Van Aeken, Francis, "Jackson DJ Software Powered by Musical Metadata," pp. 1-5.
Francis Van Aeken, "Jackson: DJ Software Powered by Musical Metadata," Van Aeken Software bvba (2005).
Conrad Parker, "Sweep: Audio Editing, Scrubbing and Latency Visualisation," Linux 2003, Conference and Tutorials (Jul. 31-Aug. 3, 2003).
www.plangent processes.com/faq.htm.
Weber, Marc et al. "Visualizing Time-Series on Spirals".

* cited by examiner

Fig. 8

SYSTEM AND METHOD FOR DISPLAYING AND EDITING DIGITALLY SAMPLED AUDIO DATA

CROSS REFERENCE TO RELATED APPLICATION

This application claims the benefit of U.S. Provisional Application Ser. No. 60/811,249 filed on Jun. 6, 2006. The entire disclosure of U.S. Provisional Application Ser. No. 60/811,249 is incorporated by reference herein.

FIELD OF THE INVENTION

The present invention relates generally to a method and system for transforming sampled data into a visual representation with which a user may interact. In particular, this invention relates to the transformation of audio data into a realistic visual depiction of a mechanical recording (e.g., a conventional vinyl record). The present invention relates to a method of emulating the traditional playback experience of the pre-digital-audio era by simulating the tactile interaction with vinyl records which were originally used as a recording and playback medium. The emulation of the visual properties of the vinyl record format facilitates the display and editing of the content of, for example, audio recordings.

BACKGROUND OF THE INVENTION

In the playback of digitally recorded audio, if done in conjunction with a visual display, such as a computer monitor, it is customary to provide some type of display that shows information regarding the audio amplitude and time offset (relative to the beginning or end of the recording) at the playback position. Typically, this takes the form of a rectilinear amplitude versus time waveform display. The reasons for providing the display can vary between the need for showing technical information regarding the audio and to provide an entertaining visual display (by viewing the audio waveform or frequency spectrum information, for example).

On the technical side, provision is usually made for manually altering the location of the playback position, such as using a cursor indicator on the display, controllable via input from a mouse. This is usually required for editing of the audio data, such as dividing a long recording into individual tracks. The editing is facilitated by observing visual cues in the display, such as regions of low signal amplitude, and using these regions as tentative locations for establishing track divisions. One drawback to this approach is that in the display of the overall waveform of a recording, the track separation locations cannot be resolved visually, because they are typically obscured by nearby audio having higher amplitudes. This is usually addressed by "zooming in" on a smaller portion of the waveform, permitting the visualization of the lower amplitude audio at track boundaries. However, since the zoomed waveform only comprises a subset of the entire audio recording, a tedious scrolling operation may be required to reliably find all track boundaries.

An additional drawback arises when editing audio not sourced from a quiet digital recording, such as when transcribing an actual analog vinyl record. Here, the amplitude at track boundaries doesn't drop to zero (digital silence); instead, a residual background noise (such as turntable low frequency noise, commonly known as "rumble") is imposed on the quiet parts of the audio. Digital silence doesn't exist in analog transcriptions of vinyl records, so it's impossible to establish accurate track mark points (i.e., the start and end points or boundaries of the track) based only on the appearance of the waveform. For instance, a gradual song fade-out or fade in can be heard quite noticeably even in the presence of vinyl background noise, which may obscure the music, when viewed as the waveform.

Accordingly, there is a need in the art for a method and system for generating an intuitive and user-friendly visual representation of discretely sampled data, wherein a user may interact with the visual representation in the form of a conventional 'vinyl' record and record playback apparatus (i.e., a record player) to perform a number of tasks, including playback, editing, content management, and error/defect detection.

SUMMARY OF THE INVENTION

The current invention provides an alternative means of display of information about the audio. Specifically, the invention describes the generation of an image of an analog format vinyl record disc, used as an interactive, virtual object. This avoids many limitations of the current art, as well as more closely and favorably linking the technical and entertainment (such as the rotation of the image on the computer display during playback, or applying other visual effects) characteristics of the display. A side benefit to the platter image, when playing back music in a way that emulates the "album" format, is that an estimate of the remaining duration of the current track, and subsequent tracks can be made visually. This enhances anticipation and enjoyment of the music.

Instead of representing the audio as a traditional type of rectilinear waveform display, a spiral radial paradigm, or a plurality of arcs, is used that permits finding features of interest in the recording with greater precision than conventional methods, while providing an easily manipulated overview of the entire audio recording.

According to an embodiment of the present invention, the plurality of digital samples are segmented into groups, or arc segments. The digital samples of each arc segment are analyzed to determine a value of at least one audio parameter for the arc segment. Next, each arc segment is displayed with a visual identifier which represents the value of the at least on audio parameter (e.g., modulation). The visual identifier, as used herein, may include, but is not limited to, a color, hue, shade, other visual characteristic which may be used to represent the parameter value. This provides a user with a visual representation in the change of the parameter in the different arc segments. Advantageously, changes in the value of the parameter in one arc segment as compared to another, as illustrated by the different visual identifiers, may be used to communicate to the user relevant information about the audio content. By comparing the visual identifiers of the arc segments, the user can 'see' changes in the audio parameter.

The simulation goes beyond a cosmetic, stylized rendition of the appearance of a vinyl record, because the appearance of the groove modulations reflects the actual audio content of the recording, or possibly other parameters derived from the audio information, which also can be displayed as an overlay or color shading of the vinyl image. Also, displayed in the circular format, periodic features in the recording are emphasized, and defects such as scratches (in the case of recordings transcribed from vinyl records) used to facilitate the calibration of the true playback speed.

According to an embodiment of the present invention, the system and method convert discretely sampled data into a display that emulates the vinyl record format. Then, the familiar tonearm/stylus/vinyl record metaphor can be used for the first time as a tool for editing and playing back digital audio files.

For example, inter-track silences are rendered as plainly visible areas of low modulation, appearing as discrete circular bands, rather than being compressed visually and obscured by adjacent high amplitude areas of the audio signal. This provides a visually informative cue or track mark starting location (i.e., a starting boundary of the track). The vinyl record image waveform display format further expands this metaphor, because by manipulation of the computer input device, such as a mouse, the playback position can be manually fine tuned by "grabbing" and "spinning" the vinyl disk, while simultaneously listening to a looped playback; of a fraction of a second's worth of audio.

After navigating to a specific place of interest in the audio recording with the aid of the vinyl image, which is a primary advantage compared to an overview type rectilinear waveform display, the process also may be enhanced at this stage by viewing a highly magnified or zoomed version of the waveform, as a visual overlay, in the familiar rectilinear format. In this way, the two methods of displaying the recording are complementary and reinforce each other's utility, while avoiding the tedious task of having to scroll slowly through the recording using only a zoomed in rectilinear display.

Setting track marks (i.e., the boundaries of the track) interactively using both the waveform and audible feedback eliminates the possibility of inadvertently placing a track mark before the actual fade-out or after an actual fade-in. The present invention allows a user to intuitive grab and spin the "platter" to refine and accelerate the editing process.

The general familiarity of the public with such records and their associated playback equipment is an advantage, as most persons already possess an intuitive grasp of the concept of the vinyl LP disc. For users lacking familiarity with analog turntables and vinyl records, these elements present an attractive aspect of the design, given the current resurgence of interest in this recording and playback medium.

BRIEF DESCRIPTION OF THE DRAWINGS

The present invention will be more readily understood from the detailed description of exemplary embodiments presented below considered in conjunction with the attached drawings, of which:

FIG. 8 illustrates a comparison of the performance of exemplary approaches for locating physical defects during a calibration process, according to an embodiment of the present, invention.

It is to be understood that the attached drawings are for purposes of illustrating the concepts of the invention and may not be to scale.

DETAILED DESCRIPTION OF THE INVENTION

The present invention relates to a method and system for generating a visual representation of input audio data received from a source, wherein in the visual representation emulates a conventional vinyl record. The input audio data may be in either analog or digital format. If the input data is in analog format, the analog data is first converted into a plurality of digital samples, according to any suitable method known in the art. Alternatively, the input audio data may be in digital format and comprise a plurality of digital samples, and, thus, no conversion is required.

The plurality of digital samples (either as received from the source or as converted) are then segmented into a plurality of arc segments. Next, for each arc segment, the value of at least one audio parameter is determined. The arc segment is then rendered and displayed with a visual identifier which visually represents the value of the at least on audio parameter. The visual identifier may be a color, shade, hue or other visual expression of the value. By presenting each arc segment with a visual identifier representation of the value of the selected audio parameter, the changes in the parameter may be seen when viewing the plurality of arc segments when arranged into a series of arcs, the series of arcs emulating a record image.

A plurality of the arcs are combined to form a visual representation of the input audio, herein referred to as the "record image". The record image comprises a plurality of arcs, arranged to emulate a conventional "vinyl record."

Figure 1:
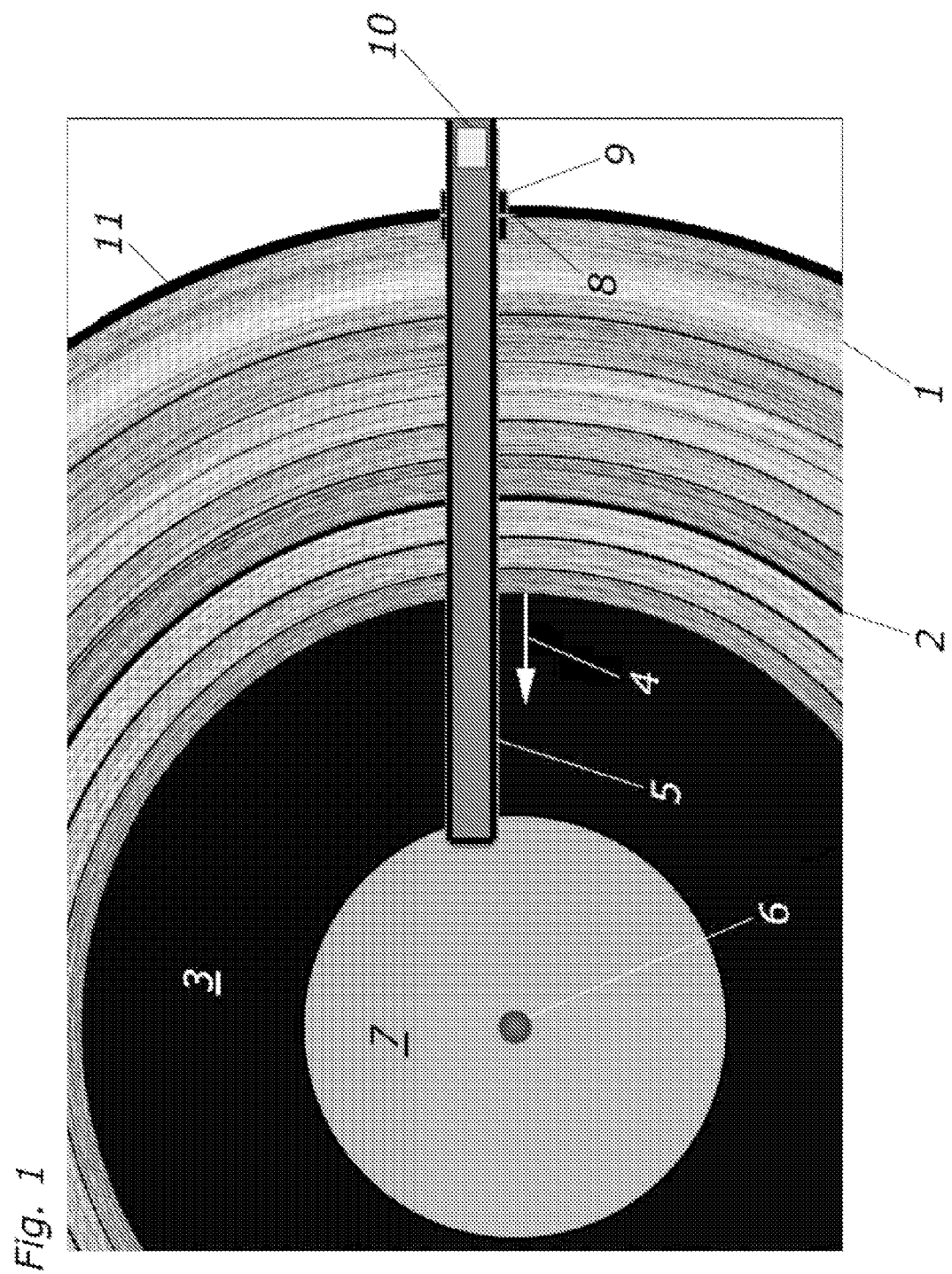
FIG. 1 is a diagram of an exemplary data display including characteristics of a conventional record playback apparatus, according to an embodiment of the present invention.

Embodiments of the present invention are described below in detail with reference to FIGS. 1-9. FIG. 1 illustrates an exemplary record image generated according to the present invention. Advantageously, a user may interact with the record image much in the way one interacts with a conventional vinyl record to perform a number of functions, as described in detail below.

The digital samples of the input data are processed (as described below with reference to FIGS. 2A and 2B) and converted to the radial representation, or plurality of arc segments making up the larger arcs of the record image. This may be accompanied by visual feedback of the ongoing process, denoted by progress animation arrow 4, as the image data, is progressively calculated and overlaid on the platter substrate 3.

Portions of the digital samples with large amounts of modulation, as assessed by the analysis algorithm, are displayed as image highlights 1, while low levels of signal modulation 2 are represented as unchanged, or nearly so, compared to the substrate data display area 3.

The platter substrate 3 may be displayed as dark gray or black color, or as a solid, bright color. The platter substrate 3 may also be patterned for aesthetic, ornamental purposes, such as with a design, photographic image, or other illustration. The highlights may be drawn with a variable opacity from 0 to 100 percent, with a 100 percent value obscuring the image of the substrate. Low levels of opacity may be used for aesthetic enhancement of the display, in conjunction with different substrate colors or visual patterns. The highlighting in areas with high waveform modulation, and substrate prominence in areas of low modulation may be inverted, providing a negative shaded image. The modulation may be represented as gradations of gray tones or as false-color shading. A combination of the two may be used to convey additional information in the data display. For example, color shading might be used to indicate differences in relative amplitude or phase between a plurality of channels.

Other aspects of the data display, which is configured to emulate a familiar object, an audio recording playback turntable, include a label area 7 for various information, a radial spindle 6, tone arm 5, playback cartridge 9, playback stylus 8, cueing emulation button 10 and lead-in area 11. According to a preferred embodiment of the present invention, a linear-style carriage-type tone arm is shown; but other aesthetic variations may include pivoted straight or curved tone arms. A linear design is illustrated in the figures because of the simpler computation of data offsets during emulated cueing operations, as described in detail below.

One having ordinary skill in the art will appreciate that features 5, 6, 7, 8, 9, 10, 11 are optional, and may or may not be included in the data display. These features, used here as a functional aesthetic construction, are intended to emulate components, features and aspects of a traditional audio analog disc recording playback system (turntable). Embodiments of the present invention incorporate these elements to leverage the user's likely familiarity and comfort level with this particular object (i.e., the turntable). For users lacking familiarity with analog turntables, these elements present an attractive aspect of the design, given the current resurgence of interest in this recording and playback medium, even among the demographic born after the onset of the mainstream application of digital sound recording.

The brightness or color of the image is calculated at a plurality of points. The practical limit of the number of points or pixels in the image is determined by the speed of the host computer and the resolution of the display device. Regardless of the resolution chosen, the image construction commences at a point lying somewhere on the substrate.

The image construed on may commence at any location on the substrate, or even at the innermost radius of the substrate. However, in accordance with the aesthetics of the emulation of the familiar analog disc playback paradigm, a starting location is chosen a small distance inset from the outer simulated edge of the substrate, commonly known as the lead-in area 11. A portion of the image display area near the inner radius also is reserved for a legend, printed description or decorative image or design, the label area 7.

The label area 7 may have a radius between 5 percent and 90 percent of the substrate radius, although the optimum value would be in conformance with the physical medium emulated, such as, for example, a 7 inch diameter 33 or 45 RPM, physical recording disc; a 10 inch 33, 45 or 78 RPM physical recording disc; or a 12 inch 33 or 45 RPM physical recording disc. For purposes of illustration of an embodiment of the present invention, a 12-inch 33 RPM LP format with multiple individual music tracks is shown, with a label radius approximately 20 percent of the substrate radius. This is somewhat less than normally used with a physical analog disc. The present invention also lends itself to construction of single-track 12, 10 or 7 inch physical format emulation, for a somewhat diminished image data display capacity, and may be useful in certain other contexts.

A small band of the substrate adjacent to the outside radius of the label area may be reserved for the lead-out area, again for aesthetic compliance and conformity with the physical playback medium being emulated.

Figure 9:
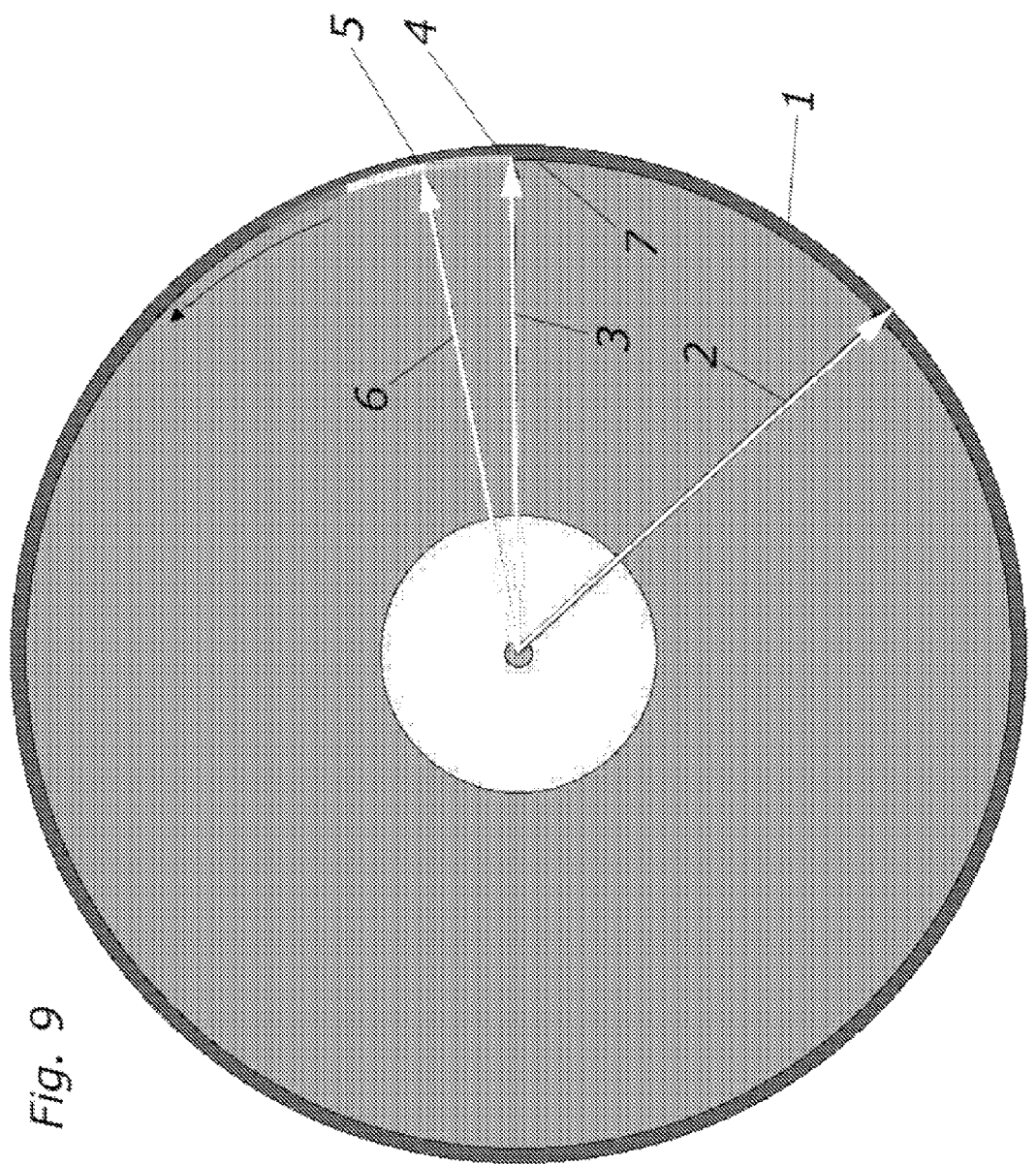
FIG. 9 illustrates an exemplary process for generating a platter image, according to an embodiment of the present invention.

As shown schematically in FIG. 9, beginning at the lead-in area 7, the image data information is applied to the blank platter substrate 3. Each pixel in the image is treated as a sub-segment of a larger arc, and has a variable, diminishing (in the case of image data application begun at the lead-in area) radius. The sub-segment is herein referred to as an arc segment. As such, according to an embodiment, of the present invention, each pixel equates to one arc segment. As the image data is applied, the arc radius is diminished. The effective radius is calculated for each pixel of the image. The radius need not have a whole-number value, because modern computer graphic imaging programs and routines are configured to alias intermediate, floating-point representations, thus providing increased realism of the spiral image drawing.

For example, as shown in FIG. 9, given a substrate 1 with radius 2 of 820 pixels, and a lead-in radius 3 of 800 pixels, the first pixel applied is considered to be part of an arc segment 4 having a radius of 800 pixels. The shading (brightness or color) of this pixel (or arc segment) is determined by the analysis model, as explained below. In the case of emulating an analog playback disc, the next pixel, arc segment 5, is applied counterclockwise from the first, pixel (because an analog disc normally is spun in a clockwise fashion, so increasing time coordinate is in the counterclockwise direction; the image data could also be applied in a clockwise direction in an alternative embodiment of the present invention). The starting radius 6 of the next arc segment (or pixel) 5 depends on the circumference and radius of the spiral arc being considered at that point.

According to an embodiment of the present invention, the unit of length of the arc segment is expressed in degrees. The arc length (in degrees) is determined by the desired quality of the final image, balanced against the computational time required. For example, if a fixed arc length of 1 degree is selected, the radius of the arc also must be continuously decreased by ((2 pi)/360) pixels for each segment to continue to maintain a spiral appearance.

According to an embodiment of the present invention, each radius step employs a fixed-radius, circular arc; each revolution of the generated image consists of concentric, discrete, non-interconnected circles. This design allows the inclusion of many of the desirable characteristics of the record image, according to an embodiment of the present invention. A preferred embodiment, of the present invention employs variable-radius, noncircular, spiral arcs to construct the record image.

The arc length also affects the way the input data is analyzed. The input data is segmented into an integer number of digital samples per arc segment. The optimum arc length for emulation of an analog playback disc is determined by the disc emulation model rotational rate, in conjunction with the sample rate of the digital input data. This arc length is determined by the following relation:

$$s/Fs$$

where s is the angular rotational rate of the disc, and Fs the digital signal sample rate.

For example, given a sample rate of 44.1 kHz and a disc rotational rate of 33⅓ revolutions per minute, each digital sample occupies an arc angle of (360 degrees/revolution)* ((33+⅓ revolutions)/60 seconds)/(44100.0 samples/second)=0.004535 degrees per digital sample.

Given the above parameters, the arc segment length must therefore be constrained to multiples of 0.004535 degrees. At an arc spiral radius of 800 pixels, this corresponds to an arc segment circumference (length) of 0.06332 pixels per data sample.

One having ordinary skill in the art will appreciate that the input data could be progressively resampled to any practically attainable sample rate, generating the optimum number of sampled points for a given arc segment length.

According to an embodiment of the present invention, a minimum arc length of 1 pixel is considered. In the above example, a minimum arc segment length of 1 pixel correspond to 1/0.06332 or 15.79 data samples. Since an integer number of samples is required, this figure is back-calculated using a minimum value of 1.6 samples per analysis sample, giving a segment length of 16/15.79 or 1.013 pixels.

Therefore, the arc segment length is predetermined by the sample rate of the input data. As the spiral radius decreases, the arc segment length, in pixels, also decreases, in proportion to the radius. Therefore, to maintain the minimum design constraint of 1 pixel of arc length, the number of samples per segment must be gradually increased (because the arc angle must be increased). This causes discrete changes to the arc segment lengths, that were found to be unnoticeable.

A computational shortcut may be taken at this juncture. Arc segments with lengths greater than one pixel may be applied that have a fixed radius within the segment. These fixed radius segments are then joined to a previous segment having a slightly larger and a following segment having slightly smaller radii, respectively. The granularity caused by this method is practically invisible. This technique was used to generate the images included in the Figures.

One additional step was performed to reduce the prominence of the locations where arcs are joined. The Root Mean Square (RMS) values (explained below) obtained are slightly low-pass filtered, so that the change in highlighting from one segment to the next is less abrupt. The filtering is a simple first-order Infinite Impulse Response (IIR) filter function, $$h1 = c1 h1 + (1.0 - c1) h0 \quad \text{Equation 1}$$

$$h0 = h1 \quad \text{Equation 2}$$

where h1 is the highlighting parameter applied to the current segment;
h0 is the highlighting parameter applied to the previous segment; and
c1 is the filter coefficient.

According to a preferred embodiment of the present invention, c1 has a value between 1.0 (no filtering) and 0.01 (significant filtering), with a value of 0.9 determined to be optimum. After calculating h1, its value is substituted for h0 which then becomes the previous segment's highlighting value for the next iteration of the arc rendering. Note that such highlight smoothing is not a requirement for the present invention, but may optionally be applied to improve the appearance of the record image.

In practice, the tradeoff between drawing many small arc segments and computational efficiency dictates that, arc segment lengths of greater than one pixel (including more data samples per arc segment) and arc line widths greater than one pixel be used. According to an embodiment of the present invention, a typical arc line width of square root (2) pixels is used, and a radius step of 1.0 pixel per revolution. Line-aliasing and transparency of the line segments, provided by the host computer's built-in graphics routines, may be adjusted to cover gaps in between adjacent arcs at different radii. According to a preferred embodiment of the present invention, the arc segment length may correspond to the drawn width of the arc segment. One having ordinary skill in the art will appreciate that, in practice, the tradeoff between drawing many small arc segments and computational efficiency dictates that arc segment lengths of greater than one pixel (including more data samples per arc segment) and arc Sine widths greater than one pixel be used. As such, according to an embodiment of the present invention, a typical arc line width of square root (2) pixels is used.

For large data sets the number of samples per arc segment, can be increased and/or the arc line width decreased. These parameters are adjustable at the discretion of the user, to provide the most aesthetically pleasing image, while maintaining a reasonable computational rate. For example, generating a complete, high quality spiral image "platter" from 30 minutes of sampled digital audio on a currently shipping consumer-level computer workstation takes approximately 30 seconds.

According to embodiments of the present invention, two primary signal analysis models may be used to emulate the appearance of the record image. One having ordinary skill in the art will appreciate that alternative models similar to the ones described in detail herein may be used to create a record image where areas of differing signal characteristics can be differentiated upon visual inspection of the image. The visual representation may be based on one or more of the following exemplary signal characteristics, including, but not limited to the interchannel or single channel phase or amplitude (modulation level); frequency balance; signal amplitude at a particular or range of frequencies; total harmonic or intermodulation distortion over a range of or at a single frequency; beats per minute value; results of signal convolution showing coherence with a comparison signal; and other known signal characteristics. Although one having ordinary skill in the art will appreciate that the present invention may be configured to generate a visual representation of any suitable signal parameter, for the purposes of illustration, the exemplary embodiments described herein related to the present invention are described with reference to signal characteristics/parameters described herein as the level of amplitude of modulation.

Figure 2A:
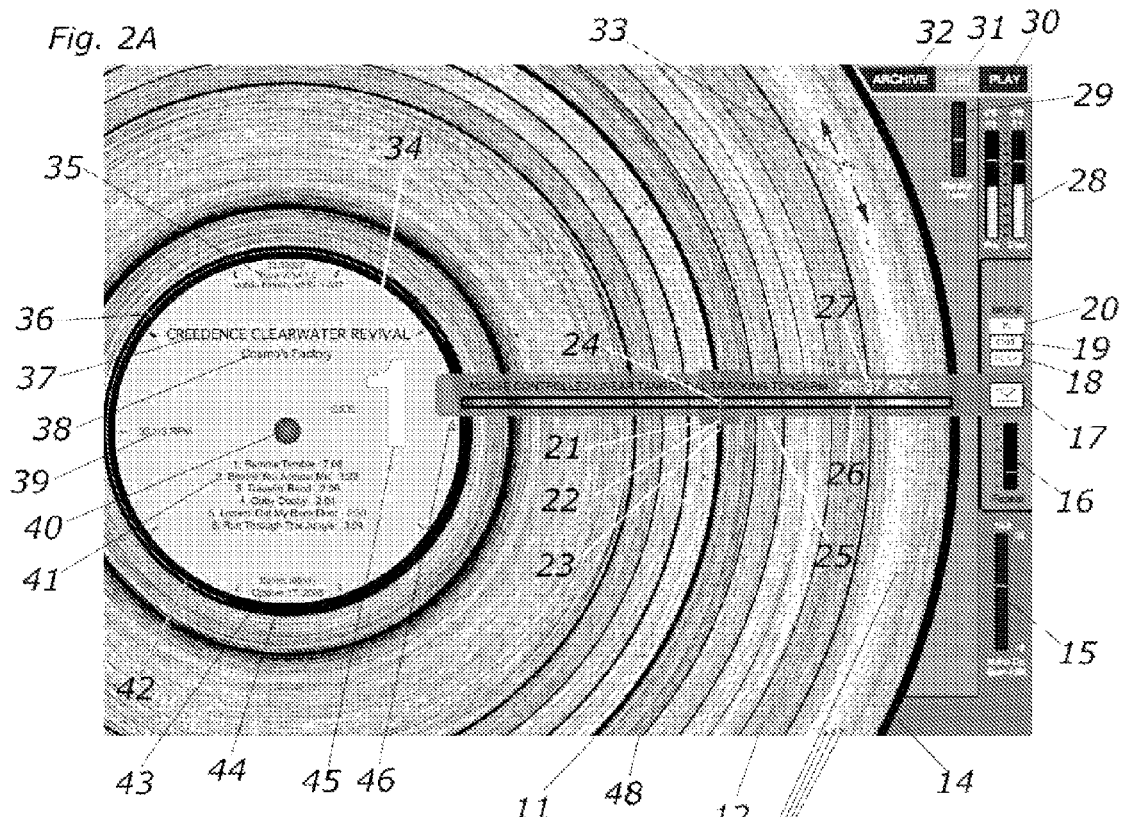
FIG. 2A illustrates exemplary components of the data display, according to an acoustic-model data rendering embodiment of the present invention.

FIG. 2A shows a record image producing according to an exemplary model according to an embodiment of the present invention, herein referred to as the "Acoustic" model. According to this embodiment, the Acoustic model calculates the RMS amplitude of the sum of the synchronized (in time) input signal channels, for the number of samples per arc segment, as described in detail above. The input signal typically comprises two channels (stereo), in the case of an audio music recording. However, any number of channels, including additional channels, may be included in the analysis. The highlighting amount (i.e., the pixel brightness) applied is proportional to the computed RMS value for the data sample. At lower amounts of highlighting, the opacity of the arc drawing may be reduced proportionately, to allow the color of the substrate to show, or a decorative design to show through, if the substrate were so imprinted.

According to an embodiment of the present invention, the opacity of the arc drawing may be varied depending on the calculated highlight level. For example, at high levels of modulation, the opacity may be increased to approximately 90 percent, and reduced proportionate to the modulation level to a minimum of approximately 30 percent at locations of low or zero modulation. Thus, if the substrate blank; color is a dark; blue, the highlights appear bluish white, and the areas of low modulation bluish black (black being the arc color used for areas of low modulation). The preferred variable opacity used is between approximately 5 and 1.00 percent. Alternatively, the opacity of the overlaid arc drawing may be maintained at a fixed value between 5 and 100 percent. At 100 percent opacity, the appearance of the image would depend solely on the arc drawing and would not be affected by any coloration or patterning in the substrate.

Figure 2B:
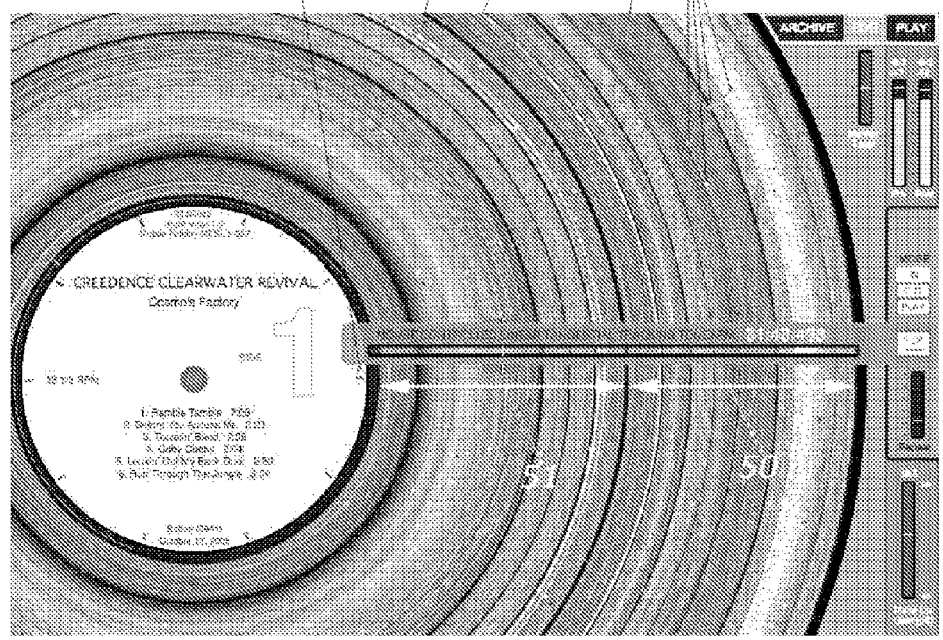
FIG. 2B illustrates an exemplary components of a data display, according to a physical-model rendering embodiment of the present invention.

FIGS. 2A and 2B illustrate an exemplary embodiment of the present invention. As shown in FIGS. 2A and 2B, portions of the data with low signal modulation appear as a dark band 11 in the image. Areas with moderate or high modulation become highlighted according to the level of modulation, as 12. Iconic markers indicated by 13 and 36 highlight regions of interest, and are superimposed on the image. Here, the markers are configured to indicate putative transients in the data, caused by defects (pops) in the source (digitally sampled from an actual analog record platter). The algorithmic method for pop detection in conjunction with the data display is described in detail below. Markers also can be displayed as a circular highlight, as 42.

The lead-in area as explained above is indicated by 14. In a preferred embodiment of the present invention, additional parameters are adjustable; a proportional slide control for make-up gain 15. A Repeat parameter 16 used in conjunction with an Editing feature and settings configured with controls 18, 19, 20 is detailed below. "Stylus cueing" for the emulated turntable is provided by control 17; playback signal amplitude metering 28 and monitoring volume adjustment 29. Controls 30, 31, and 32 affect the operational mode of the preferred embodiment of the present invention; namely, playback, editing or archiving (recording) mode, respectively.

In accordance with the turntable/platter paradigm, the offset into the digitally sampled input data can be adjusted by moving the emulated cartridge 21 attached to the emulated tone arm 25. As known in the art and used herein, the term "offset" refers to the position in number of digital samples from the beginning of the recording of digitally sampled input data. For an audio recording, this could be represented either by the sample number or by a temporal value (time coordinate) in seconds. The exact sample position is indicated by stylus 23; sighting aids are provided as marks 22 and 24. The data offset time coordinate in minutes and seconds is indicated by time display 27. To assist in locating a low-modulation area, a ribbon display 26 representing the integrated highlighting at each discrete radius is provided. According to an embodiment of the present invention, the ribbon display represents the mean amplitude value of the signal over one circular arc (one revolution) at the radius on the platter image corresponding to the radial position on the ribbon. Its purpose is to provide an additional visual aid to locating areas of low or high modulation, for manually adjusting the playback or editing location with the emulated stylus/cartridge. Although the ribbon is configured here to show the signal amplitude/modulation level, it alternatively may be configured to display other suitable signal parameters.

The stylus radial offset from rest position at the lead-in area (data offset time coordinate 0) and angular position of the platter are used to back-calculate using an inverse of the image generation algorithm to generate an accurate offset into the digital source data file used to generate the image. For example, given a manually chosen stylus position, the offset into the data is simply the fraction of the total radial displacement from the lead-in area to the start of the lead-out area, because each revolution of the platter represents the same amount (time coordinate) of data (at constant rotational velocity). When spinning the platter manually, such as when editing the sampled data, as described below, any additional data offset is calculated by the rotational rate represented by the platter image times 1/360 times the manually changed angle of the platter.

An alternate method of determining an accurate offset into the source file may be accomplished by saving a lookup table with an offset corresponding to each rendered image point, or a lookup table for each image radius, and the data offset calculated based on the sample offset for a given offset angle from the lookup value. The precision in generating the image is sufficient to ensure pixel-accurate correspondence between the image and the corresponding original sampled data. In the case of a more complicated "vari-pitch" image generation method mentioned below, the arc radius would not necessarily decrease in a simple linear fashion during the generation of the image, and an alternate method, such as a look-up table, may be used to correlate the stylus position and data offset.

The angular position of the platter is controlled by clicking and spinning the platter, in emulation of the familiar turntable paradigm. A "hand" cursor 33 is used to provide a feedback cue for the user. One having ordinary skill in the art will appreciate that any suitable pointer icon may be used in the present invention. The platter-spinning paradigm and its applications to examining and editing the data are explained below, in conjunction with FIGS. 4 and 5.

Optionally, based on the type of input data, additional features may be added to the record image. For example, for a digital music recording, the record image may include information display on the label area 34, including artist name 37, title of recording 38, track names and times 41, plus spaces for additional data 35 and 43. The additional information 35 may include the calibrated platter rotational rate/pitch adjustment, the application of which is described in greater detail below with reference to FIGS. 6 and 7. The additional information 43 may include the date of the recording of the digitally sampled music or data file.

The rendering model used (i.e., the Acoustic or the Physical model) is indicated by 46 and 47 on the label data area, according to an embodiment of the present invention. The Physical rendering model generates a somewhat different image (shown in FIG. 2B), than the Acoustic model (shown in FIG. 2A). The overall difference between the images generated by the two models are not limited to contrast and/or brightness differences in the generated highlighting. This is illustrated by the arc highlight indicated by 48 in the Acoustic model and 49 in the Physical model. The prominent highlight 48, at the same radial offset indicated by 49, illustrates an example of the kind of differences in the image appearance which result from the choice of the Acoustic or Physical model. Other differences in the models may be found in comparing the images of FIGS. 2A and 2B.

The Physical model is designed to more closely emulate the physical appearance of an analog recorded disc. The translation of an electronic signal to the physical undulations on the disc causes a greater physical undulation to appear when the stereo channels have a reverse polarity relationship. Therefore, to emulate the physical appearance of the disc, the Physical model subtracts the corresponding digital samples of the stereo channels before calculating the RMS amplitude value. In practice, visual comparison of actual, physical platter recordings to the emulated images usually yields the most realistic representation when the Physical model is used.

Other models could be constructed, such as using Peak waveform values to generate highlighting information, for example. However, in the preferred embodiment of the present invention, the best results in generating interesting, informative and aesthetically pleasing images were obtained with the two models described herein.

An additional aspect of FIGS. 2A and 2B is that the entire sampled data file was used to generate the platter image. Here, the sampled file was a continuously recorded digital transcription of two sides recorded from a vinyl analog music disc, Creedence Clearwater Revival's "Cosmo's Factory," Mobile Fidelity catalog number MFSL-1-037. An accurate emulation of the original physical platter would consist of only one side of the music disc. In the Edit mode of the preferred embodiment of the present invention, the full-file platter image assists in selecting the individual track mark locations. For example, using the track editing features of an embodiment of the invention, described below, the locations in the digitally sampled recording corresponding to Side 1 and Side 2 of the original, physical vinyl based recording are established, as are the individual track or song locations/offsets, by visually locating areas of low modulation on the platter image, and manually positioning the stylus 23 at each of these locations, in turn, and noting the corresponding stylus positions. In practice, the stylus position coordinates would be noted and saved by the software application hosting the invention, at the command of the user. This process is further explained below in the description of FIGS. 4 and 5, and in greater detail below. After assignment has been completed, the individual emulated disc side platter images are then generated from the corresponding subsets of the file.

The manufacture of analog music discs sometimes employs a technique known to practitioners in the art as "vari-pitch," which adjusts the inter-groove spacing (pitch) of the disc. This prevents areas of large modulation from causing the cutter head, used to generate the master stamper disc, front crossing into a previously cut groove, ruining the stamper. The inter-groove spacing also may be controlled manually at the discretion of the mastering engineer. Normally, inter-groove spacing is smaller on quiet areas of the disc and larger on loud areas of the disc, particularly those with high amplitude low-frequency program content. This technique generally increases the duration of audio that can be placed on a disc, compared to using a fixed inter-groove spacing dictated by the maximum modulation level of the recording.

According to an embodiment of the present invention, the method and system employ a fixed inter-groove spacing. Consequently, visual comparison of platter images created by the systems and methods of the present invention and corresponding physical media (if transcribed digitally from an analog disc) illustrate the differences that exist therebetween. However, there are a plurality of different results possible when mastering the physical recorded disc, as dictated by the judgment of the mastering engineer. Because of this uncontrollable variable, the platter image generated by the method an system of the present invention resemble, but not necessarily appear identical, to a physically manufactured product made using the same audio data. While it would increase the complexity of the platter image generation model used by the present invention, it would be feasible to apply similar vari-pitch or adjustable inter-groove spacing techniques in the invention.

The models used to generate the platter image use nearly unfiltered digitized input data, which, when obtained from samples of analog music discs, has already been equalized to compensate for the emphasis scheme used for playback of analog disc recordings. Here, nearly unfiltered indicates that the input data samples are filtered to less than the usual extent dictated by the pre-emphasis signal filtering that's normally applied during the manufacture (during the mastering stage) of vinyl records. For example, the RIAA equalization emphasis curve, well-known to practitioners of the art, accentuates high frequencies while attenuating low frequencies; the corner frequency between the two regions being approximately 1 kHz. The corresponding playback equalization is the inverse of the curve used in the disc manufacturing process. The de-emphasis applied at playback to high frequencies minimizes the influence of high frequency noise generated during the playback process. The low frequency emphasis compensates for the low frequency roll-off applied to the sound recording during cutting of the disc, to limit the mechanical excursion of the disc cutter, which is greatest at low frequencies. A strict recreation of the physical characteristics of the disc would apply the exact RIAA emphasis/de-emphasis curve. Both platter generation models used in the present invention use a hybrid approach that only attenuates the low frequencies below 100 Hz, with a single-pole roll-off similar to the RIAA equalization scheme. The high frequencies are left emphasized, which produces a satisfactory result. Changes in appearance of the platter image naturally would result from different filtering schemes. However, the choice of a particular filtering scheme is not fundamentally required by the present invention.

Figure 3A:
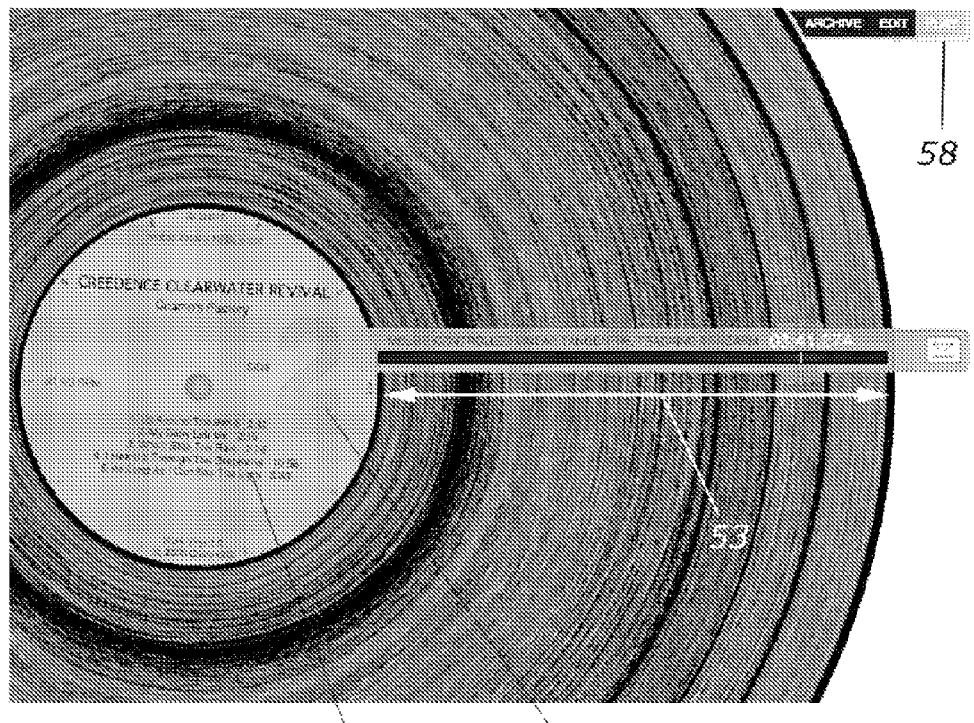
FIGS. 3A and 3B show modified data renderings using subsets of the data shown in FIGS. 2A and 2B.
Figure 3B:
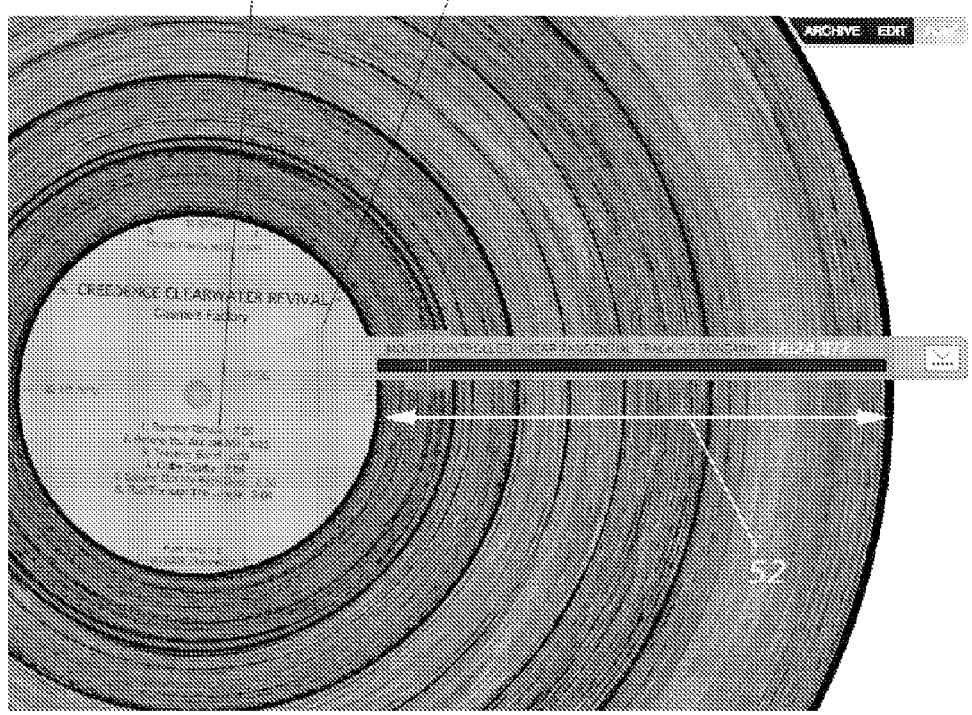

In FIG. 2B, the segment indicated by the double arrow 50 represents the digital samples from side 1 of the sampled music disc; the double arrow of 51 represents digitized information from side 2 FIG. 3 indicates the Play mode 58 of a preferred embodiment of the present invention, after generating the individual disc side images. The Play mode loads in the disc side images and adjusts the sensitivity of the stylus positioning (time coordinate) accordingly. The image segment 50 of FIG. 2B corresponds to the image segment 52 of FIG. 3B. The image segment 51 of FIG. 2B corresponds to the image segment 53 of FIG. 3A. The label information area of the platter image data, 54, 55, 56, 57 also is updated accordingly for side 1 in FIG. 3B and side 2 as shown in FIG. 3A.

Figure 4A:
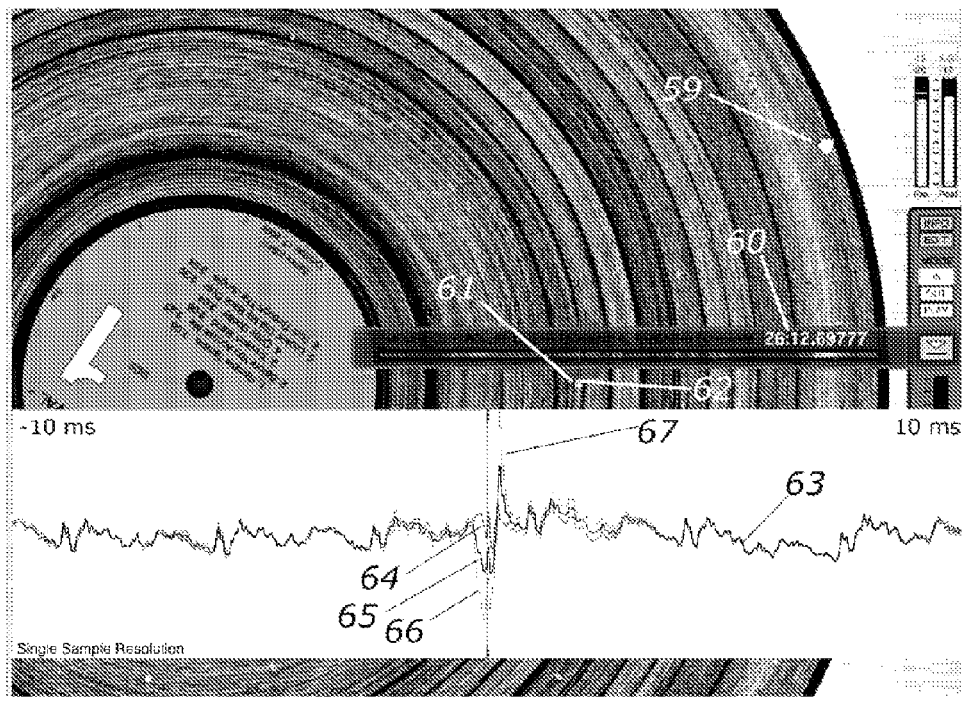
FIGS. 4A and 4B illustrate a process according to an embodiment of the present invention wherein a radial depiction of waveform data is used to assist in locating features of interest in the sampled data file.

FIG. 4 illustrates the use of the platter cueing paradigm to adjust the offset of the waveform inspector. FIG. 4A shows an offset into the original file, obtained by clicking and sliding the cartridge and stylus 62 to the desired offset. The mouse is positioned above the image of the platter, and provides feedback to the user by clenching the hand cursor when the mouse is clicked. At this stage, the preferred embodiment of the present invention reveals a waveform display, indicating the source waveform represented by the platter image at the offset of the stylus position. Here, the offset has been adjusted to place the stylus over an iconic overlay 62 that indicated a waveform amplitude maximum; in this case, caused by a physical defect (pop) on the analog source disc. The corresponding time offset in the source data is indicated by display 60. The waveform 63 is comprised of left channel 64, right channel 66 and 67, and their normalized sum 65.

Figure 4B:
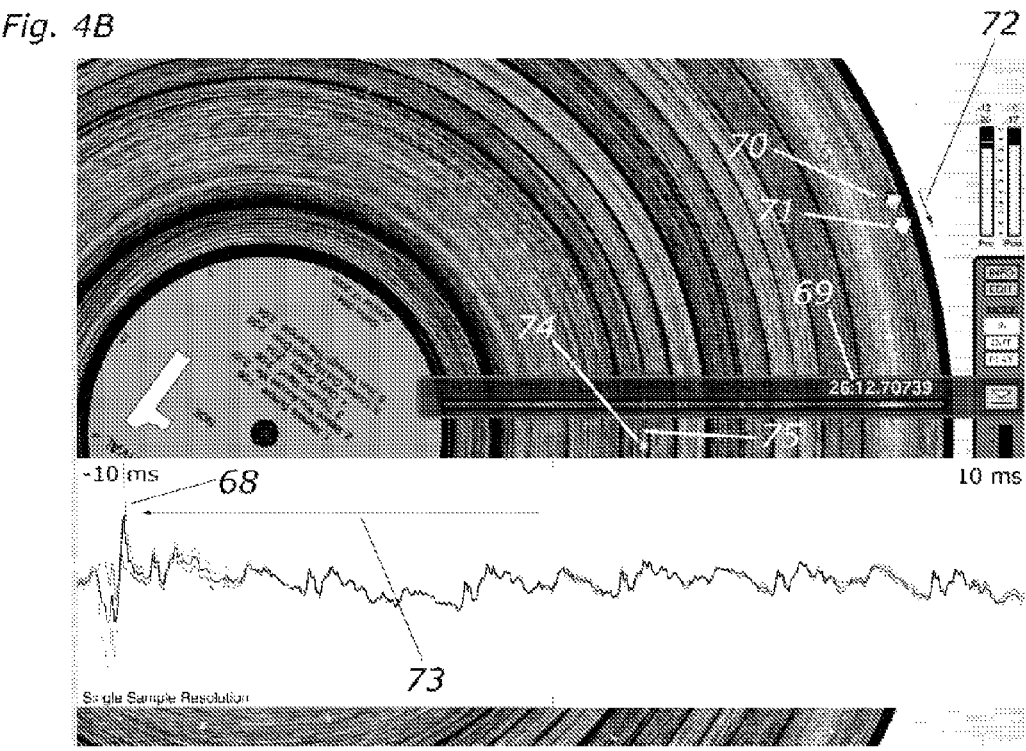

In FIG. 4B, the mouse has been dragged, from former position 70 to new position 71, in the direction, illustrated by arrow 72, rotating the platter image clockwise about the center spindle, and incrementing the offset into the data file. This is indicated by an increase of approximately 10 milliseconds in the offset time indicator 69, the change in position of waveform maxima icon 74, and translation of the peak 68 from waveform 63 by distance 73 in the waveform display.

Figure 5:
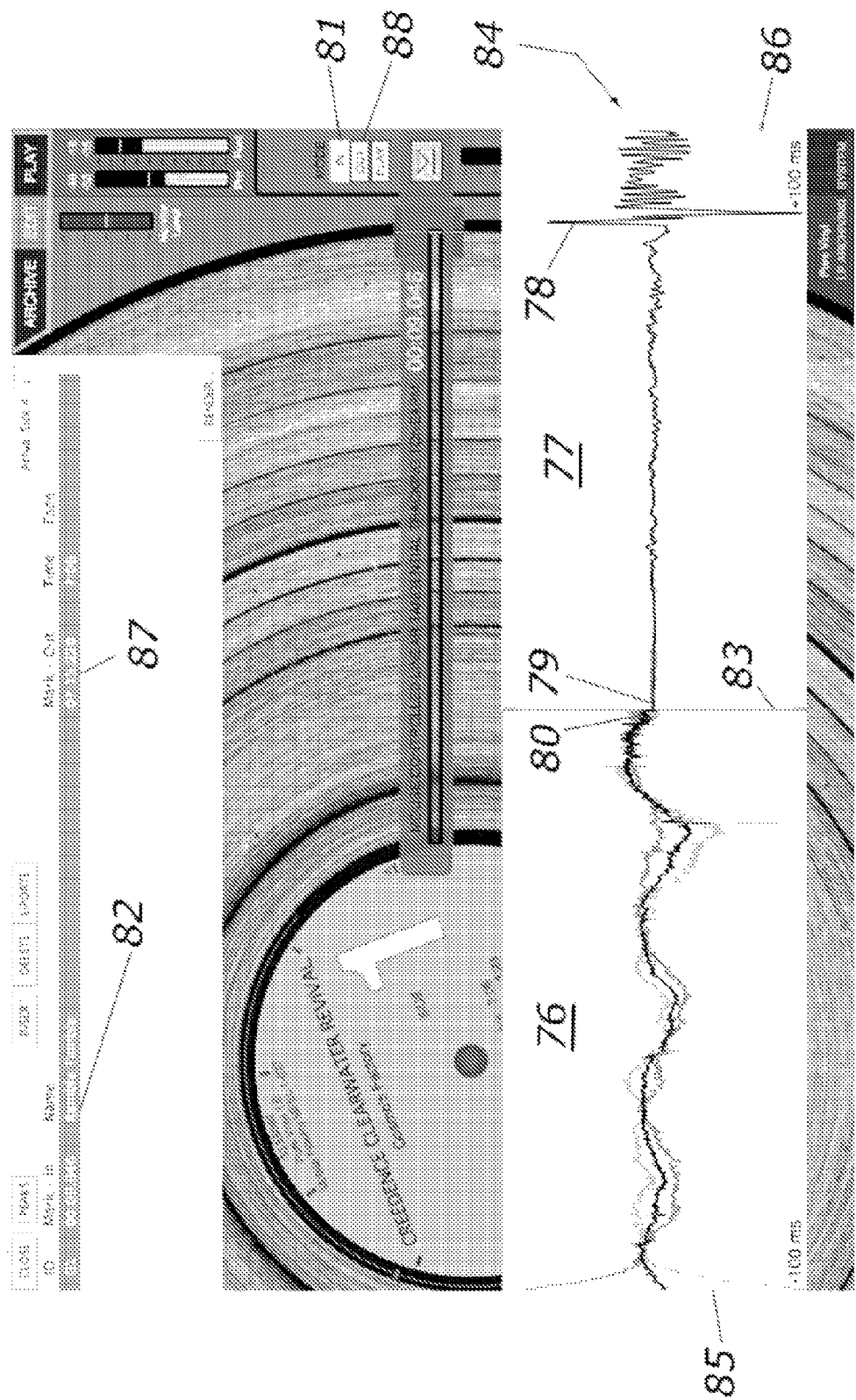
FIG. 5 illustrates an use of an embodiment of the present invention to locate track boundaries in an analog music recording.

FIG. 5 illustrates using the platter paradigm to determine and set audio recording track boundaries. This may be accomplished visually using only the waveform inspector 84, or visually and audibly with the inspector in conjunction with listening to a defined, continuously looped portion of the audio file of interest.

In FIG. 5, the stylus is positioned in the platter lead-in area, just prior to the start of the music information. The waveform inspector display is split into two portions. The left half, 76 is the waveform at a time offset prior to the stylus position. The right half, 77, depicts the waveform at a time offset following the stylus position. The fiducial mark 83 indicates the waveform at exactly the stylus position.

Each half of the waveform display is independently normalized for amplitude. The waveform halves depicted in 76 and 77 are halves of a contiguous waveform; the apparent discontinuity is caused by differences in scaling applied to the display. The waveform immediately to the right of 83 appears smaller because its scaling is influenced by the onset of the music waveform at 78.

As the mouse is clicked and dragged on the platter image surface, the waveform in the display 84 scrolls horizontally and is rescaled in two halves about the fiducial point 83. (The waveform depicted comes from the same source used to generate all other Figures.)

The turntable platter paradigm becomes extremely useful in setting a track mark point, especially when dealing with data sampled from an analog source. In contrast to data originating from a digital recording, analog data often is accompanied by various forms of background noise. Unfortunately, because of the masking effects of the noise, it's not always possible to accurately determine the beginning or end of an audio track based solely on the appearance of the waveform. In the preferred embodiment of the present invention, the Mark-In mode selected by pressing control 81 causes the audible playback and continuous looping of the waveform from the edge of the frame 85 to the fiducial 83, the portion of the frame denoted by 76. The duration of the loop is set by the Repeat interval control 16 in FIG. 2A, here 100 milliseconds.

The track mark-in, or start point of the track, may be precisely determined by gently rotating the platter, which sets the precise stylus offset, while listening to the playback. The platter is rotated until any audible lead-in to the music waveform 78 is absent. The auto-normalization of the lead-in waveform also applies to the audible data as well as the waveform inspector. This amplifies the quiet prior to the music introduction, ensuring that any musical information, is included within the track mark-in, even if masked by noise, and the nonmusical portion of the recording is excluded. When a satisfactory mark-in has been established, it may be finalized, in the preferred embodiment of the present invention, and displayed accordingly in list 82.

A similar procedure is used to establish the end point of the track, also referred to as the track mark-out position, except that the mark-out mode 88 is selected, and the looping mode of the inspector display is reversed. Instead of looping the portion of the waveform prior to the cursor position, 76, the part of the waveform looped during playback is that after the cursor position, between fiducial 83 and edge of the looping frame 86. In a similar fashion to that described above, the platter is rotated until musical information at the lead-out of the song is absent. This is finalized and used as the Mark-Out as depicted 87.

FIGS. 6 and 7 depict using defects in the recorded material to calibrate the proper playback speed. A primary source of error in transcription of analog disc recordings is the quality of the speed accuracy of the turntable. Many mid-priced "audiophile" turntables rely on an AC synchronous motor to determine the rotation rate. The line frequency of utility power is subject to variation, which affect the rotational speed accuracy. Mechanical tolerances in the turntable components can also affect the rotational speed. Finally, playback speed inaccuracy can arise in the case of sampled digital audio if the sample clock rates of the recording and playback devices are different, again due to component tolerances. According to an embodiment of the present invention, these influences are lumped together and considered to be due to turntable absolute speed inaccuracy.

In the case of sound data sourced from an analog recording platter, surface noise caused by physical damage to the disc surface, due to normal wear and tear, tend to accrue. Some of this noise may be caused by scratches or physical contamination involving adjacent grooves on the analog disc. The noise is easily identifiable by its sound as an audible "pop" or as a prominent transient in the waveform display. The periodicity of such pops in two adjacent grooves is approximately equal to the reciprocal of the disc rotational rate. For a 33⅓ RPM disc, this would be 1.800 seconds. Any deviation from this value would reflect an error in the turntable playback rotation rate.

The measured deviation can be used to recalibrate the image generation to increase the realism of the platter image simulation, and also for correcting the time base (absolute pitch) of the digitized recording via resampling. Techniques for resampling digital audio to arbitrary values for pitch modification are well-known to practitioners of the art. The calibration procedure described below is valuable for determining the degree of pitch correction required.

In FIG. 6 a sorted list 89 and 99 of the amplitude maxima in the digitally sampled file is presented. Two adjacent entries in the list at time offsets 26:10.90964 (90) and 26:12.69802 (100) are separated by 1.78838 seconds. This is close to the putative turntable rotation period (for a 33⅓ RPM 12" LP record) of 1.8000 seconds per revolution, and the maxima do indeed correspond to a "pop" or defect on the surface of the source analog disc recording. (There is an additional maxima, at 26:09.12041 seconds that is indicated on the platter image iconic overlay 92; but the calibration example below focuses on the other two maxima. The time delta between maxima 91 and 92 is 1.78923 seconds, therefore the percent relative error between choosing among these two measurements for calibration is 100*(1.78923−1.78838)/1.78838 or less than 0.05 percent.)

Figure 6A:
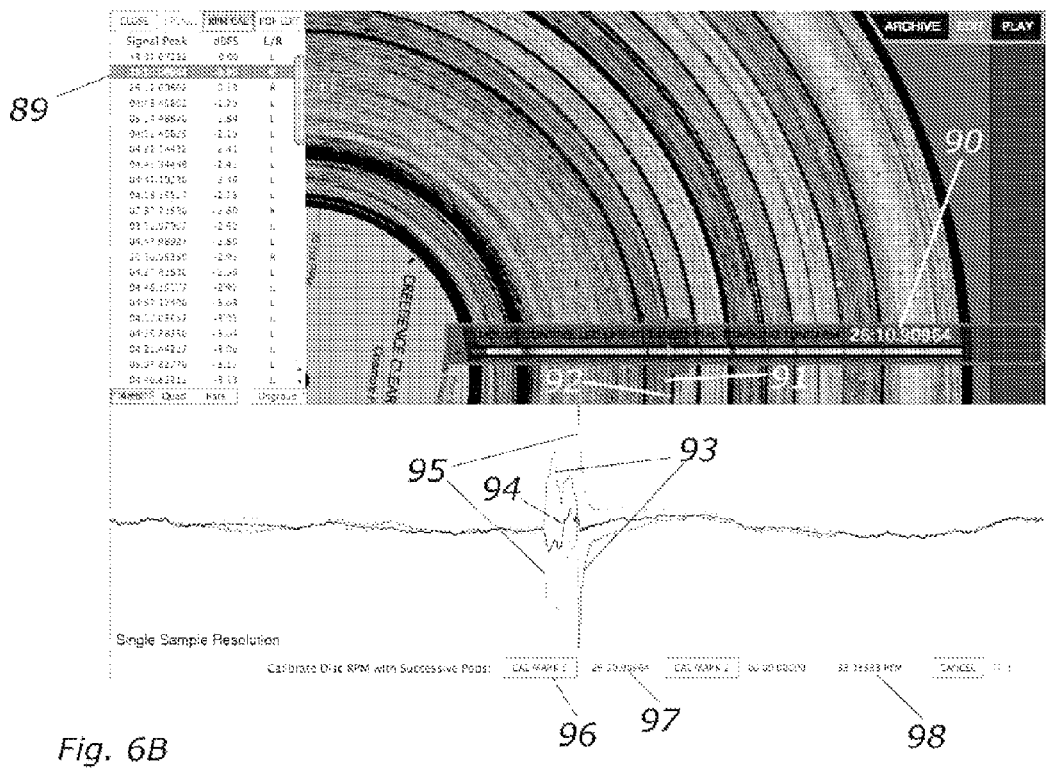
FIGS. 6A, 6B, 7A and 7B illustrate an exemplary process for calibration of the time base of a data sample using physical, periodic defects present in the source material, according to an embodiment, of the present invention.
Figure 6B:
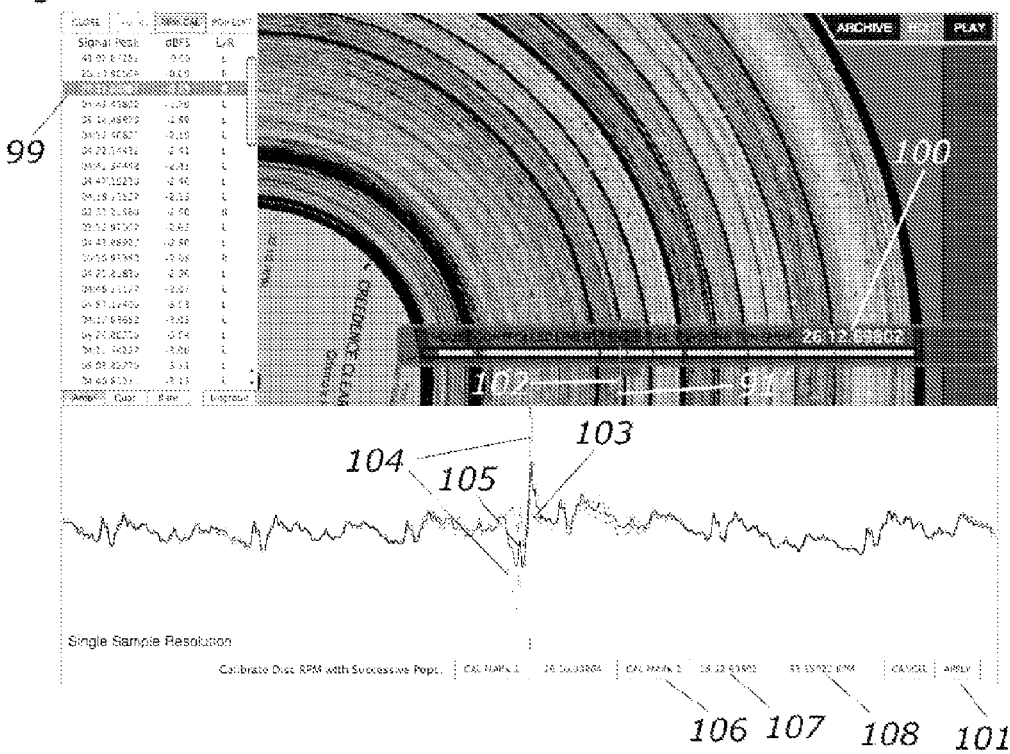

In FIG. 6A the stylus is positioned at the first maxima at time offset 26:10.90964 seconds. The maxima also is indicated iconically on the platter image 91. By rotating the platter, the offset may be fine-tuned to coincide with the peak maximum 95 (right channel) or 93 (left channel). Generally, the channel with the transient having the most consistently prominent waveform shape among the two time offsets would be chosen. The sum of the waveforms of the two channels also is displayed 94. The selection of the peak maximum may be done manually or automatically.

In a preferred embodiment of the present invention, the selection of the first calibration offset is confirmed by clicking button 96. The time offset is echoed in the text display 97. The next maxima 99 is selected in the list and fine tuning of waveform maxima position 104 performed manually, if necessary. The iconic representation 91 of the first maxima at time offset 26:10.90964 (89) has rotated clockwise to 91' and the second maxima at time offset 26:12.69802 now is positioned (102) directly under the stylus. If the rotation rate of the turntable were exactly 33⅓ RPM, the iconic overlays 92, 91/91' and 102 would be positioned on adjacent arcs of the platter image, instead of being offset circumferentially from each other. The offset occurs on the image because of the turntable rotational velocity error. Confirmation of the second calibration mark is confirmed by pressing button 106, and the corresponding time offset 107 and calculated actual rotational rate 108 are echoed on the display. Pressing button 101 confirms the calibration and regenerates the platter image, basing the platter revolution on a period of 1.78838 instead of 1.8000 seconds.

Figure 7A:
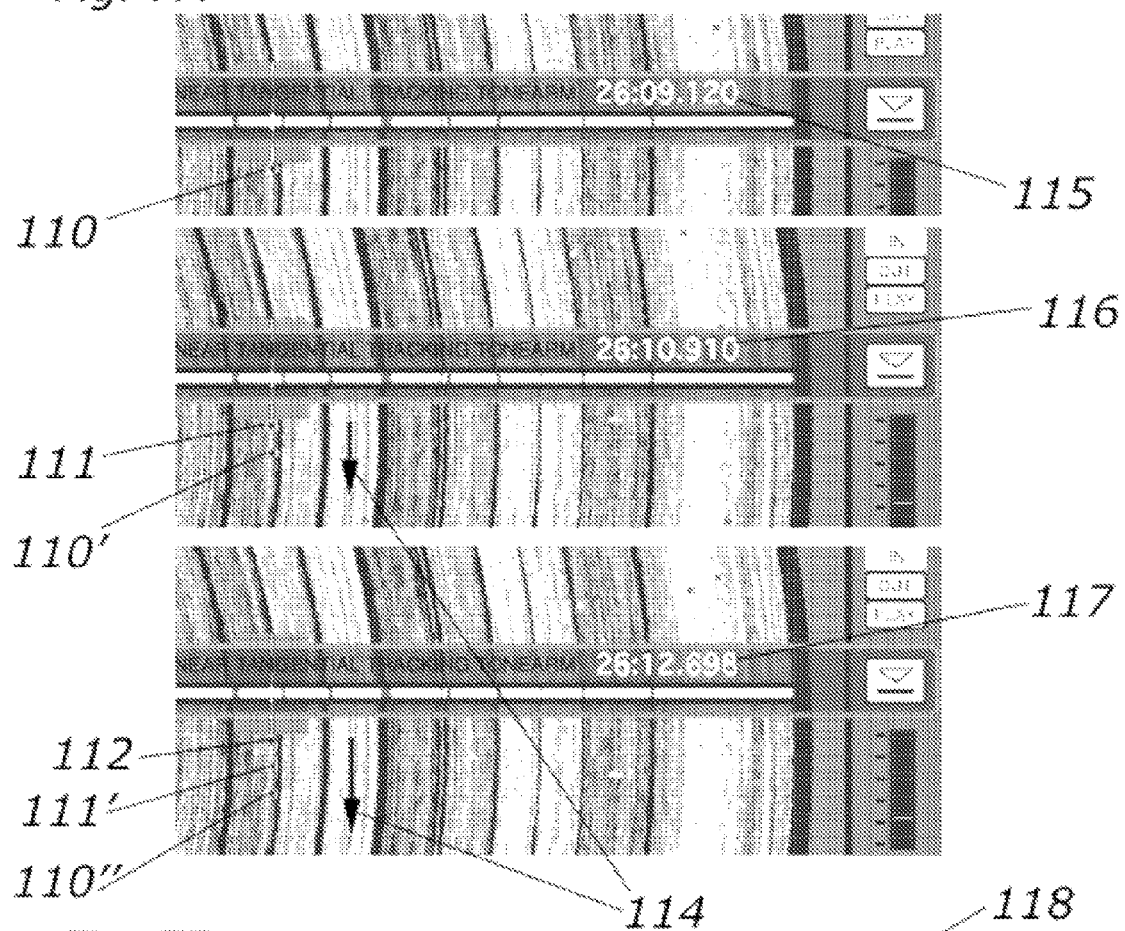
Figure 7B:
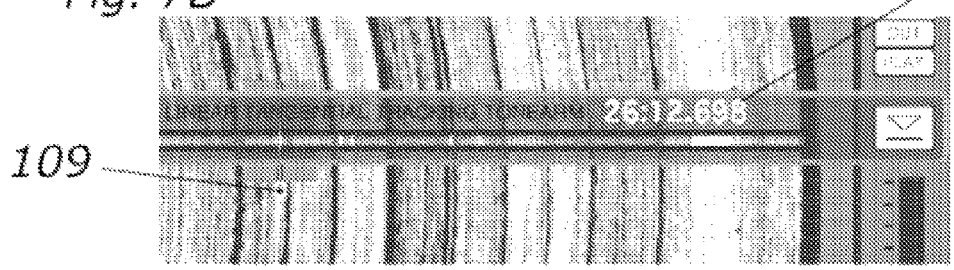

The resultant platter image show's that the iconic overlays indicating the peak maxima are now adjacent, as shown in FIG. 7B (109), which focuses on the iconic overlay detail. FIGS. 7A and 7B are described more thoroughly below, however, overlays 112. 111' and 110" directly correspond to 92, 91/91' and 102, respectively, in FIGS. 6A and 6B.

This calibration procedure could conceivably be applied at different regions of the recording, in case the absolute rotational error varies throughout the recording process, and presuming that other surface defects exist at advantageous locations on the recording. However, it's unlikely that properly cared-for analog discs will have a large number of physically suitable defects; therefore, this technique is primarily intended as a means of a single-point rotational rate calibration that's applied uniformly for the duration of the recording. It is possible that over a time period of typically 30 minutes, representing the duration of a single side of an analog disc, the short-term variation in absolute rotational rate error can be neglected.

Figure 8:
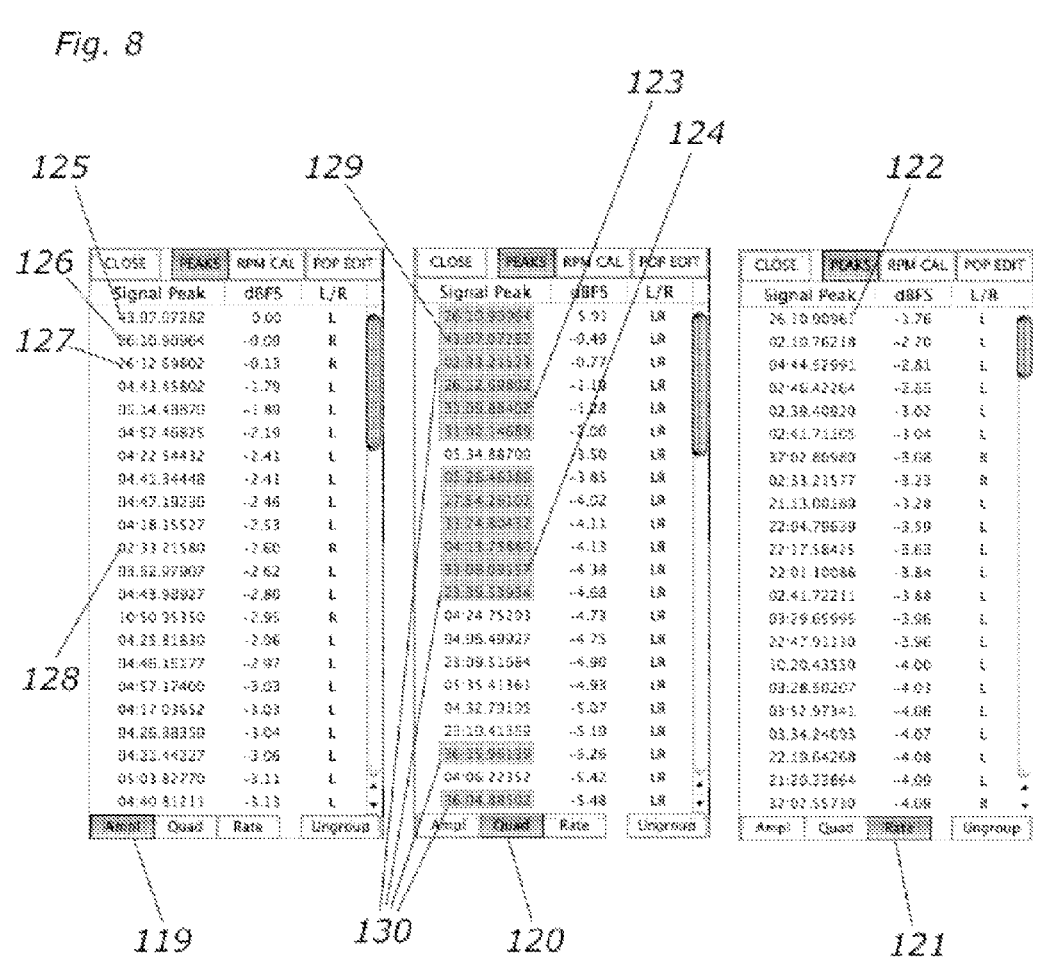

For example, another suitable pop defect was located on this recording with the aid of automated tools. In FIG. 8 at offsets 33:09.88402 (123) and 33:08.09557 (124) pop defects were located. The time offset between these defects is 1.78845 seconds. Comparing this to the defects used for the above calibration example, 26:10.90964 (90) and 26:12.69802 (100) which are separated by 1.78838, the resultant percentage difference in rotational error between using these two measurements for calibration is 100* (1.78845−1.78838)/1.78838) or less than 0.004 percent difference. While it's possible that the close agreement is fortuitous, more likely it indicates that the variation in turntable rotational velocity accuracy is probably small over the time needed to digitally record and transcribe an analog audio disc.

FIG. 7B is a more detailed view of the result of the calibration 109, where the overlap of the iconic representations of peak maxima demonstrate that the calibration successfully corrects the effective rotational rate.

FIG. 7A shows the offset of the maximum iconically represented as 110 with time offset indicated 115. The next revolution (arrow 114 indicates the direction of rotation) of the platter image brings maximum 111 into view, at time offset 116. Maximum 110 is offset because of rotational rate error to 110' relative to 111. A subsequent clockwise rotation of the platter image brings maximum 112 into view at time offset 117. The previous maxima also are visible at 110' and 111'. Applying the calibration corrects the platter image for rotational rate error bringing the maxima into adjacent registration 109 at time offset 118. The latter time offset is the same as time offset 117 because maximum 112 was used as the point of reference for the rotational rate correction.

According to an embodiment of the present invention, tools for transcribing audio disc recordings to a digital format, includes tools for locating physical "pop" defects on the discs by analyzing the digitally sampled audio. This facilitates the calibration procedure described above.

Three separate algorithms were considered for "pop" detection. In FIG. 8, analysis results using the three algorithms are sorted in tables according to the strength of the measured parameter. Two obvious methods consider the amplitude or slew rate of the signals as the pop detection parameter. The first algorithm uses the maximum amplitude of the left or right signal channels. Of the 22 candidates displayed in the list 119, three (126, 127, 128) were physical pop events (confirmed by examining the waveform and audibly by playback). (Event 125 was generated by lifting the physical playback stylus from the disc, understandably generating a large amplitude transient.) The second algorithm uses the maximum slew rate of the left or right signal channels. Of the 22 candidates displayed in the list 121, only one (122) was an actual pop event. The other candidates were comprised of valid musical information.

Noticing that the transient waveforms in FIG. 6A showed that the relative signal polarity during the pop event was inverted at the peak of the pop, another algorithm that measured the difference between channels was used. In list 120, 13 of 22 candidates highlighted (130) were verified as being caused by physical defects in the analog disc. The other pop event, 129 was the stylus lift mentioned above. This event also has characteristics in common with pop defects, namely the large amplitude inverted polarity difference between channels.

While this invention has been described in terms of several preferred embodiments, there are alterations, permutations, and equivalents, which fall within the scope of this invention. Although the image display has been described in terms of generating emulated images of analog audio discs, any data possessing an innate periodicity lends itself to this type of display. The effective rotational period of the display could be adapted to suit the periodicity of the available data. A recording of an electrocardiogram of a human or animal is a suitable example of this sort of data. Presuming an average heart rate for a particular patient of 60 Hz, with a primary periodicity of roughly 1 Hz, a long time record of events could be displayed on the virtual platter surface. By setting the virtual display rotational rate at 2 Hz, 120 heartbeat events would be displayed per revolution. Each platter could show the equivalent of 30 minutes or more of the electrocardiogram recording. A steady heart rate would be reflected by events aligned along well defined radii, similar to the example for the calibrated disc rotational rate above. Any variations in rate would be immediately apparent upon visual examination of the platter image. In contrast, discerning fluctuations in data periodicity by the visual examination of a linear, orthogonal x-y plot would be much more difficult over the time frame envisioned here.

It should also be noted that there are many alternative ways of implementing the methods and apparatuses of the present invention. For example, the virtual tone arm could be represented as a linear carriage as depicted, or a pivoted linear or curved virtual tone arm. The platter metaphor also could be extended to other periodic implementations, such as a cylinder with the data image applied to the inner or outer surface, with the time dependent axis parallel to the axis of symmetry of the cylinder.

The methods and apparatuses of the present invention may be used to generate an emulated platter image from the contents of a digital recording that is intended to be mastered to a Compact Disc or Digital Versatile (Video) Disc. For ornamental or marketing purposes, the emulated platter image may be impressed on the surface of the Disc, or used in the packaging or marketing materials of the Disc, providing a design that has added appeal because it would indicate the actual characteristics of the information contained on the Disc.

According to an embodiment of the present, invention, the methods and systems may be used to convert discretely sampled audio data, such as music into the circular display format indicated by FIGS. 2 and 3. A display of data obtains that emulates the appearance of a popular format for music dissemination, the vinyl (or formerly shellac) record. The general familiarity of the public with such records and their associated playback equipment is an advantage, as most persons already possess an intuitive grasp of the concept of the vinyl LP disc. Further, the simulation goes beyond a purely cosmetic, stylized rendition of the appearance of a vinyl record, because the appearance of the groove modulations reflects the actual audio content of the recording.

Selecting a track marking or cueing point by moving the "tonearm" and spinning the disc was the intuitive means employed by professional disc jockeys during the vinyl LP format era.

The method and system convert the discretely sampled data into a display that emulates the vinyl record format, or record image. The record image may optionally comprise features of a conventional vinyl record and record player, such as, for example, a tonearm/which may be used as a way to edit and play back digital audio files. Areas of low modulation between tracks are easily selected by dropping the tonearm "stylus" on the "vinyl" surface. The track beginning/end is then precisely located by "grabbing" and rotating the platter image.

An exemplary mode of operation is described in detail below. First, an audio file consisting of a single or multiple tracks is opened with the application software configured according to the present invention. The source of the audio file may be a transcription from a vinyl LP, a digital recording from another source (such as a cassette tape or live concert recording), or a digital recording copied from a CD or other digital source.

Next, the present invention automatically analyzes the audio data and generates a realistic, accurate image of a single-track or multiple track vinyl record platter. An example of this step of the operation is shown in FIGS. 1 and 2, The user may specify the color of the 'vinyl' substrate, in the same sense that commercially released records sometimes are pressed on colored or clear vinyl for cosmetic or promotional purposes. The user may also choose from the Acoustic or Physical rendering options, depending on the rendering intent or personal preference. The user also may specify the platter rendering format, corresponding to those typically encountered, such as, for example, RPM (33⅓, 16, 45, 78, etc.) and image size (e.g., 7", 10", 12"). If digitally transcribing an analog music disc, the selected format may be the same as the format of the source medium.

The user may also specify that an image be superimposed on the substrate, and the music "grooves" drawn over the image with varying degrees of transparency. The image may be a digital photograph, drawing or an abstract design, for example.

If the audio recording is sourced from an analog LP consisting of multiple individual sides, or a CD transcription of a recording originally released as a vinyl LP, the platter image created according to the present invention may consist of a single "side" comprised of all the tracks.

Next, the tonearm/stylus assembly is used to assign track mark points. The user may assign a track mark for each individual track, or only marks to delineate the sides of the LP record that is the source of the digital transcription. In the second instance, a two-sided transcription of a vinyl LP may be assigned four mark points. These mark points would correspond to the music lead-in of side 1, the music lead-out of side 1, the music lead-in of side 2, and the music lead-out of side 2. As an alternative, the user could assign marks and titles to all individual tracks.

The procedure for setting the track marks is described in detail above with reference to FIG. 5. As described above, after moving the tonearm/stylus to a blank modulation groove, the record is "spun" and the audio waveform displayed. The operation mode selected is indicated in field 81 on FIG. 5, for mark-IN. When the central part of the quiet area of the groove is located, the cueing button 17 (FIG. 2A), is engaged. The portion of the waveform displayed on the screen to the left of the mark-in location is repeated in a looping fashion, and played back audibly over the computer's speakers. The mark-in location may then be fine-tuned by gently rotating the platter until only lead-in noise is audible. If the mark-in location were moved to past the beginning of the audio, a small snippet of the audio may be heard. The rotation of the platter while listening to the loop and watching the waveform provides the user with interactive feedback. This permits rapidly selecting the mark-in location. The mark-in location then is confirmed.

Next, the track (or album side) mark-out optionally is selected. The procedure is similar to selecting the mark-in. Mark-OUT button 88 is engaged. The stylus is positioned at the end of the previous track (or album side). When the mark-out location is successfully located, only the noise of the lead-out of the previous track is heard. If the mark-out location is adjusted to a location before the end of the audio, a snippet of the lead-out of the audio is heard.

This editing procedure is invaluable when used in conjunction with making high-quality, accurate transcriptions of music recordings from a vinyl to a digital format. Compared to music recordings sourced from digital master recordings, and distributed in a digital format, the modulation in between tracks of a transcribed vinyl disk does not drop to silence, because of record vinyl surface noise. When editing purely digital recordings, locating track mark points is a trivial matter, because one merely uses the waveform display to cut or select the tracks at obvious, digitally "silent" locations.

However, digital silence doesn't exist in analog transcriptions of vinyl, so it's impossible to establish accurate track mark points based only on the appearance of the waveform. For instance, a gradual song fade-out or fade-in may be heard quite noticeably even in the presence of vinyl background noise, which may obscure the music, viewed as the waveform. However, setting track marks interactively using both the waveform and audible feedback eliminates the possibility of inadvertently placing a track mark before the actual fade-out or after an actual fade-in. The ease of use of the visual representation generated according to the present invention allows the user to intuitively grab and spin the "platter" to further refine and accelerate the editing process.

The procedure of setting track, marks may be repeated for each track. In the case of a multisided transcription of a vinyl record album, provision is made to specify the number of sides that are present in the recording. When the lead-out mark of the last track on side one has been determined, the label area is clicked. The software program configured to implement the present invention interprets this as moving to the next side of the album. Track marks and song titles may continued to be added. This is repeated until all album sides are completed.

Either before or after establishing track markers, the user may optionally calibrate the accurate rotational velocity of the platter image (and putative playback speed) of the vinyl transcription. This calibration procedure depends on locating physical defects in the audio recording caused by scratches or blemishes on the source disc. According to an embodiment of the present invention, one or more tools may be provided to aid in selecting suitable defects. For example, for a 33⅓ RPM vinyl LP, at least one pair of defects must be located that are spaced approximately 1.8 seconds apart. The spacing depends on the putative rotational rate (16, 33⅓, 45, 78 RPM, etc.) of the analog source disc.

According the present invention, the system includes a Calibration mode, as illustrated in FIG. 6. In this example, the first defect is selected and confirmed by pressing button 96. The second defect is selected and confirmed by pressing button 106. Both choices are then confirmed by pressing button 101.

The final platter images are then automatically generated. In the case of only setting four mark points (for a two-sided album), two sound files are optionally created, corresponding to the audio file segments bounded by the chosen mark points. Likewise, two new platter images are generated, using only the portions of the sound file delineated by the mark points. In the case of marking multiple tracks, the recording may optionally be split into multiple sound files corresponding to the individually marked tracks. These files may be used to generate CD-R based compilations or albums, or the files could be incorporated into digital music libraries, stored on a computer or other device, for playback with music library management software, such as, for example, iTunes by Apple Computer, Inc. The platter images include information on the central label area, which may include a decorative design or image, in addition to track listing, track timings, artist, album title, side number, RPM and other information.

In the case of only marking the album side boundaries, the sound files generated would emulate the experience of playing back the music in discrete, side long sections, similar to playing LP records. According to an embodiment of the present Invention, the host software Is used to record vinyl transcriptions at sample rates (88.2, 96, 176.4, 192 kHz or other) and quantization resolutions (24, 32, 48, 64 bits or other) which significantly exceed those commonly used for music reproduction in the CD medium. In certain instances, it is possible for vinyl playback systems to exceed the bandwidth of CD recordings. The bandwidth of LP cutter heads and high quality playback styli/cartridges can extend to 50 kHz or more. There is some evidence that the ultrasonic information conveyed from vinyl playback helps to preserve spatial and timing cues when listening to the recording. Further, the audio transcribed from the vinyl can be recorded without applying the RIAA inverse equalization that is required for accurate playback; merely by amplifying the signal from the playback cartridge with a linear preamplifier. (Proper passive resistive/capacitive loading of the cartridge would need to be observed, of course). The high-sample-rate audio file may be equalized later, in software, during playback. This arrangement creates an archival copy of the information on the audio LP disc. Even further, the edits made as described as above could serve as nondestructive markers that are used to coordinate the playback process. An additional advantage is that digitally applied inverse equalization is immune to errors arising from component (resistor, capacitor, inductor) tolerances present in analog equalization networks.

In this vein, the turntable calibration may be used as a basis for precision resampling of the archived high-sample-rate file to create a transcription to CD or DVD format that eliminates pitch errors caused by incorrect turntable rotation rate, and more faithfully represents the source material (elimination of analog component errors in inverse equalization).

The tape bias information may be preserved by the high sample rate used for archiving. This allows for the removal of the analog "wow" and "flutter" frequency modulation distortion not only caused by the tape equipment used to record and manufacture the LP, but also to correct problems due to the short-term variations in speed of the vinyl playback turntable. creating, in effect, a very high stability vinyl playback system from a possibly marginal mechanical source.

After generating the final platter images, provision is made to display an album side image and play back the original or rendered audio files. The tonearm may be used in initiating playback. The stylus may be dropped at the beginning of the platter image lead-in groove, or at a specific track location. The present invention smoothly rotates the platter image at a realistic rate, emulating the vinyl (shellac, etc.) playback experience.

Hence, besides the utility of presenting the audio data in this format, to facilitate examination or editing of the file, the audio playback experience can be enhanced in an entertaining manner. In Play mode, the present invention causes the platter image to spin smoothly at a realistic velocity. This allows users to enjoy a realistic simulation of the visual aspects of the vinyl music playback experience, that is absent when playing back digitally recorded music. The tonearm/cartridge/stylus also tracks the "grooves" of the platter image, moving laterally according to the playback offset position in the image, indicating the playback progress.

An additional benefit to the platter image, when playing back music in a way that emulates the "album" format, is that an estimate of the remaining duration of the current track, and subsequent tracks may be made visually. This enhances anticipation and enjoyment of the music.

According to an embodiment of the present invention, the systems and methods may be used in the used-record retail marketplace. A standardized form of the platter image generated by the present invention from a digital transcription of an analog record disc may be used as a source of grading the physical condition of used, "collectible." or rare recordings. This image may be provided by a seller to a potential buyer in lieu of a physical inspection, because of geographic issues, for instance. An advantage conferred by this method rests in the fact that an apparently physically immaculate disc can contain significant surface noise from wear and tear, etc., not apparent unless the disc is played. Since the present invention uses the audio transcription of the information on the disc, flaws otherwise invisible to visual inspection may be revealed.

Finally, several computer-based music playback software applications, such as iTunes by Apple Computers, provide a mechanism for displaying entertaining visuals during music playback. Such mechanisms are typically used by third-party vendors, such as creators of so-called "visualizer" plug-in software. According to an embodiment of the present invention, the method and system may functioning as a means of improving the music enjoyment experience by generating simulated vinyl "single" or "LP" representations and displaying the animated rotation of such images during music playback, with superimposed tonearm/stylus, etc. These images may be generated upon initial playback, then stored for further use or display. This extends further to generating vinyl images from music organized in existing play lists, creating hybrid vinyl images that would not typically be manufactured in a physical vinyl format.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:
1. A method comprising:
   segmenting, by a processor, a plurality of digital samples related to input audio data into a plurality of arc segments;

determining, by the processor, a value of at least one audio parameter based on the digital samples of each arc segment;

arranging, by the processor, the plurality of arc segments to form a variable-radius arc having a smooth curve;

arranging, by the processor, a plurality of variable-radius arcs to form a record image;

displaying at least one arc segment with a visual identifier representing the value of the at least one audio parameter; and marking a user-selected boundary of a track of the input audio data based on a command received from a user via an interaction with the record image.

2. The method of claim 1, wherein the input audio data comprises analog data, and further comprising converting the analog data into the plurality of digital samples.

3. The method of claim 1, wherein the record image emulates a vinyl record.

4. The method of claim 1, further comprising positioning each arc segment in the arranged arc based on a radial displacement from a central point of the record image and an angular position on a circumference of the record image.

5. The method of claim 4, further comprising determining a time location of the audio data contained within a particular arc segment based on the radial displacement and angular position of the particular arc segment.

6. The method of claim 1, further comprising adjusting a playback speed of the audio data.

7. The method of claim 1, further comprising editing the audio data based on an additional command received from the user.

8. The method of claim 1, further comprising visually representing an audio data defect in the record image.

9. The method of claim 8, further comprising removing the audio data defect based on an additional command received from the user.

10. The method of claim 1, wherein the user-selected boundary of the track comprises at least one of a start point or an end point of the track.

11. The method of claim 1, further comprising highlighting a feature of the audio data in the record image based on an additional command received from the user.

12. The method of claim 1, wherein the plurality of variable-radius arcs are arranged in a spiral to form a visual representation of the record image.

13. A system comprising:

a memory; and a processor communicatively connected to the memory, the processor configured to:

receive input audio data, segment a plurality of digital samples related to the input audio data into a plurality of arc segments;

determine a value of an audio parameter based on the digital samples of each arc segment, arrange the plurality of arc segments to form a variable-radius arc having a smooth curve, arrange a plurality of variable-radius arcs to form a record image, display at least one arc segment with a visual identifier which represents the value of the audio parameter, receive a command from a user via an interaction with the record image, and execute the command received from the user to identify a user-selected boundary of a track of the input audio data.

14. The system of claim 13, wherein the input audio data comprises analog data, and wherein the system is configured to convert the analog data into the plurality of digital samples.

15. The system of claim 13, wherein the processor is configured to edit the audio data.

16. The system of claim 13, wherein the processor is configured to identify at least one defect in the audio data.

17. The system of claim 16, wherein the processor is configured to remove the at least one defect.

18. The system of claim 13, wherein the processor is configured to highlight a feature of the audio data on the record image.

19. A non-transitory computer readable medium comprising instructions that, when executed by a processor, cause the processor to perform operations comprising:

generating a plurality of variable-radius arcs arranged radially to form a visual representation of a vinyl record, wherein each variable-radius arc has a smooth curve and comprises a plurality of arc segments each representing a digital sample related to the audio data, and wherein each uniform width arc segment is displayed with a visual identifier which represents a value of at least one audio parameter relating to the digital sample;

arranging, by the processor, the plurality of variable-radius arcs to form the visual representation of the vinyl record;

displaying at least one arc segment with a visual identifier representing the value of the at least one audio parameter; and marking a user-selected boundary of a track of the audio data based on a command received from a user via an interaction with the visual representation of the vinyl record.

20. The non-transitory computer readable medium of claim 19, further comprising generating at least one feature of a conventional record player.

21. The non-transitory computer readable medium of claim 20, wherein the at least one feature comprises a tone arm.

22. The non-transitory computer readable medium of claim 20, wherein the at least one feature comprises a cartridge.

\* \* \* \* \*